Nov. 5, 1946.    C. S. ROBINSON    2,410,749
INSTRUMENT PANEL MOUNT
Filed Nov. 2, 1944    2 Sheets-Sheet 2
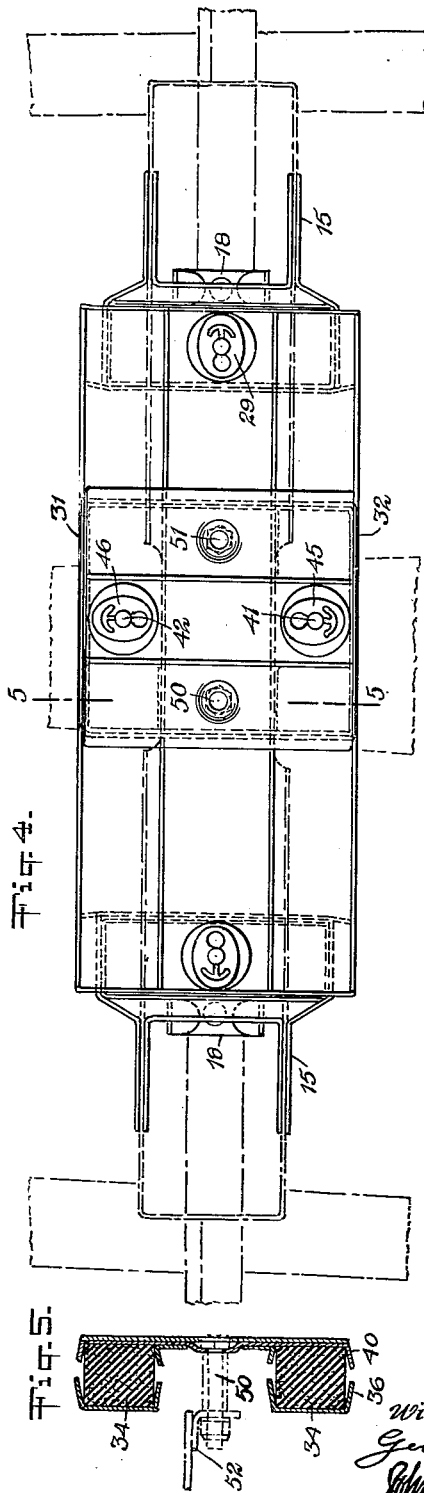
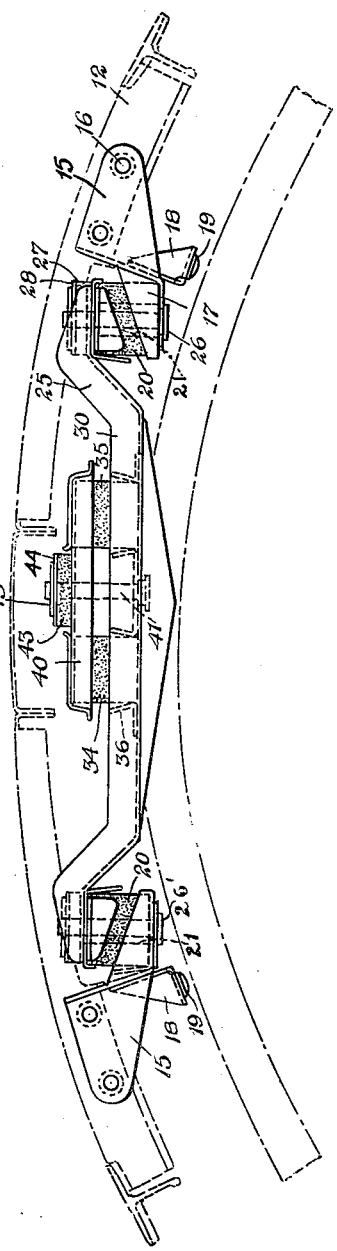
INVENTOR.
Cecil S. Robinson Patented Nov. 5, 1946

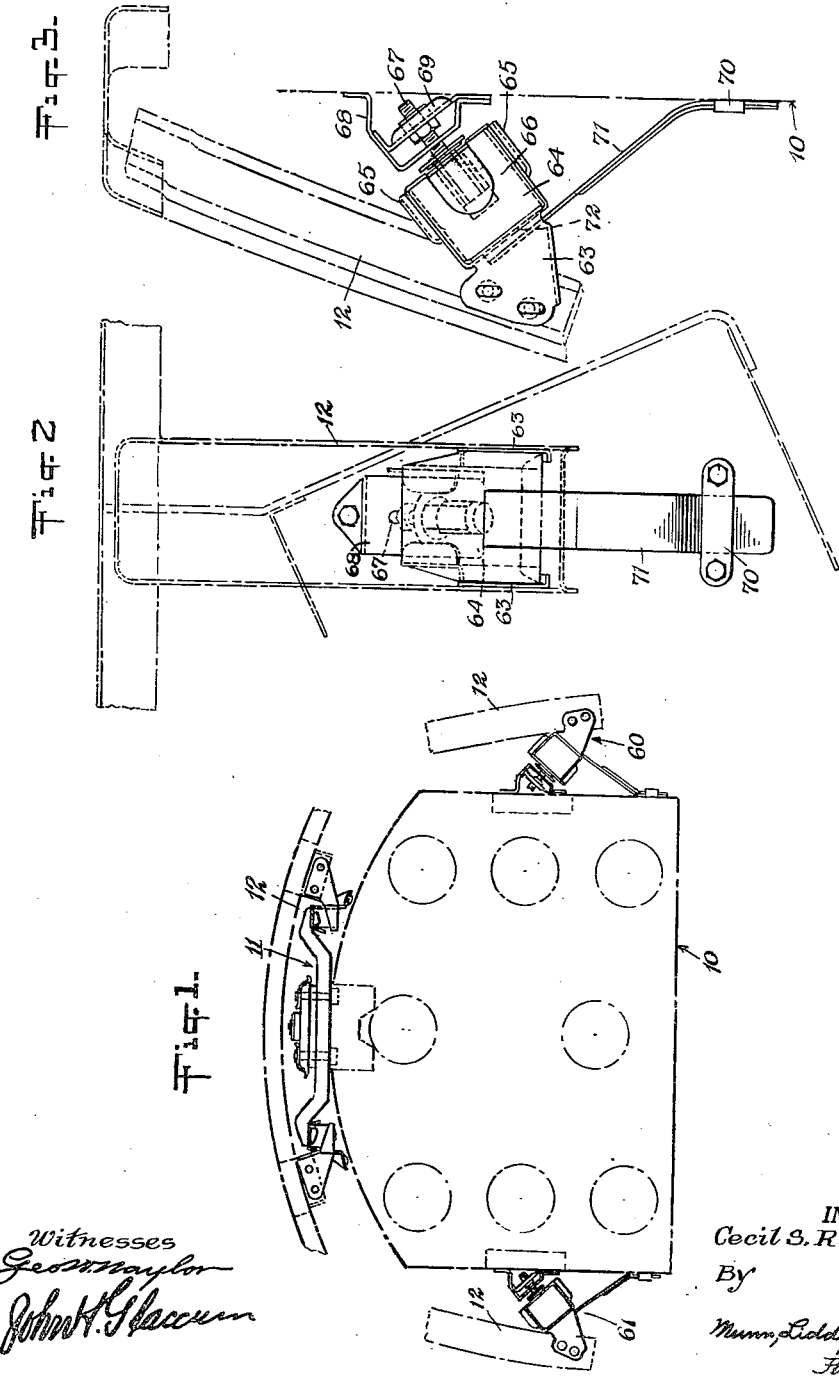

2,410,749

UNITED STATES PATENT OFFICE 2,410,749

INSTRUMENT PANEL MOUNT

Cecil S. Robinson, New York, N. Y., assignor of one-half to Dorothy H. Robinson, New York, N. Y.

Application November 2, 1944, Serial No. 561,605

7 Claims. (Cl. 248—358)

This invention relates to anti-vibration mountings and more particularly to an installation where the object to be mounted may be suspended or supported from a single location.

While I have shown my invention applied to an instrument panel such as an instrument panel for airplanes, it will be appreciated that my mounting is applicable to many uses where this type of suspension or support is desirable.

In the accompanying drawings I have shown an instrument panel mounted by suspension. It will be appreciated that equal results may be obtained by supporting the panel from the bottom thereof rather than suspending it from the top.

It has been customary to attach instrument panels to airplanes by means of four rubber supports at the four corners of the instrument panel—these rubber supports being bolts mounted in rubber disks of the so-called "shear type," capable of absorbing vibrations only along the axis of the bolts. These corner locations placed the supports where vibration was a maximum, so that they were frequently overloaded and sometimes even amplified the vibration. In any event they were not well adapted to absorb the torsional vibration about the longitudinal axis of the airplane so often experienced in flight.

The visible and invisible vibrations transmitted to instrument panels thru such conventional quadrilateral supports have often proved destructive to the delicate parts of the numerous instruments in the panel. These breakdowns in vital instruments have been both dangerous and expensive, and attempts to correct them by strengthening the instruments have added weight and tended to reduce their precision.

The present invention arranges the cushioning supports so as to absorb vibrations from all directions, including torsional vibrations; and leads the path of the vibrations thru successive cushioning supports so located in relations to neutral axes as to prevent overloading of the cushions or the build-up of harmonic amplifications. Results in flight have shown a high degree of vibration absorption as compared with the conventional four corner supports, with a consequent reduction in instrument troubles.

The objects are to provide a mounting for installations of the general type described which will substantially prevent the transmission of harmful vibrations to the supported apparatus; which will avoid harmonic build-ups or amplifications in the operating range of frequencies; and which will reduce the transmitted vibrations to an order of amplitude which can be tolerated by instrument or other sensitive apparatus.

A further object is to provide retaining bolts and buffer cushions which will retain the main cushions in place without bonding, and which will also limit the play of the main cushions. A particular object here is to provide a form of limiting buffer cushions or check bolts which are safe against failure and which will check excessive action of the main cushions without building up elastic responses or harmonic amplification.

Other objects and advantages will appear from the following description and accompanying drawings, in which—

Figure 1 is an elevation showing one use of my mount;

Figure 2 is an end view of stabilizing means which may be used in connection with my invention;

Fig. 3 is a side view of said stabilizing means;

Fig. 4 is a top plan view of my supporting means;

Fig. 5 is a view taken on the line 5—5 of Fig. 4;

Fig. 6 is a side elevation of my supporting means.

Referring more particularly to the drawings, Figure 1 shows a panel indicated at 10 supported by means of my device 11 from the frame 12 of an aircraft. In this particular installation, a lower sub-assembly 15 is fastened to the frame 12 by screws 16 or in any conventional manner. This assembly includes the member 17 which is welded to the bracket 15. An extension 18 carries a rubber grommet 19 to limit the movement of the instrument panel 10. Member 17 is so constructed as to form a platform for the cushion 20 upon which rests an intermediate sub-assembly 25. The cushion 20 is provided with a bore therein 21 adapted to receive pin 26 extending through the member 17 through the bore 21 through the intermediate sub-assembly 25, through the pad 27 and the plate 28 and is held in position by the spring clip 29. A similar pin 26' and assembly is provided on the other side. The bore 21 is of sufficient diameter as is the bore in the intermediate assembly 25 so that the pin 26 has no contact with the cushion 20 and no metallic contact with the intermediate sub-assembly 25.

The intermediate sub-assembly 25 may be made of channel members and is so formed as to provide a drop platform section 30 which may be substantially in the plane of the lower portion of the cushion 20. The intermediate sub-assembly is provided with a pair of cushion assemblies at either side 31 and 32 which may be a continuous cushion with a bore similar to the cushion 20 running at right angles thereto or may consist of a pair of cushions 34 and 35 positioned by the elements 36 which are so formed as not to restrict motion of the cushion when under vibration but prevent them from being moved out of place.

An upper sub-assembly 40 positions the cushions at either side and is held in place by pins 41 and 42 extending through the intermediate assembly through the upper sub-assembly, through pads 43 and plate 44 and fastened by the spring clips 45 and 46. Unlike ordinary rubber buffers or check bolts the pads or retaining cushions 43 as shown in Fig. 6 are of sponge rubber or similar material of relatively low load factor and correspondingly ample area so as to have a slight or low natural period not likely to amplify any incoming vibration. Being relatively weak mechanically, they are so reenforced by the washers or plates 44 and spring clips 45 and 46 of steel or similar material that they are amply strong to hold any load that may come thru the bolt 41. This novel form of cushioned check bolt will be found effective wherever a non-resonant cushioned check in one direction is desired. The clearance in the openings around the bolts 41 and 42 in the assembly 40 is sufficiently large so that there is no metal to metal contact to transmit vibration. At either side of the upper sub-assembly are the bolts 50 and 51 which engage the bracket 52 supporting the instrument panel. It will be seen that the instrument panel is supported by the bolts 50 and 51 which in turn are supported by the upper sub-assembly 40 in turn supported on the cushions 34 and 35 on the intermediate frame 25 which is supported by the cushions 20 on the lower sub-assemblies 15, it being understood that the construction of the lower sub-assemblies is identical. Since the various cushions are so supported that they need not be bonded or permanently secured to the metal parts, it will be appreciated that my device may be readily assembled or disassembled without discarding any metal parts, that cushions may be replaced if necessary without difficulty or waste.

While the panel as shown is supported by the device 11 in order to prevent undue swinging movement or reaction damper sub-assemblies 60 and 61 may be provided at either side thereof. These assemblies are shown in Figures 2 and 3 and may include a stabilizer 63 fastened to the frame 12. The bracket 63 has a rectangular cup 64 on each side of which are concave portions 65. Mounted in the cup 64 is a stabilizer cushion 66 in which is embedded the stabilizer rod 67 which is fastened to the stabilizer rod bracket 68 by means of check nuts 69. The rectangular corners of the cup 64 hold the corners of the cushion 66, and in view of the concave portion 65 the cushion is free to vibrate within the walls of the cup member 64. A damper clamp plate 70 may be fastened to the side of the instrument panel to support a damper 71 consisting of a flat spring member having frictional engagement with the bottom 72 of the cup member 64. While I have shown a particular type of damping assembly and stabilizer member it will be appreciated that any suitable arrangement may be used with my mounting without varying from the principles of my invention. It will also be appreciated that the mounting may be placed at the bottom of the instrument panel to support it rather than to suspend it.

The pins 41—42 and 26—26' are located so as to provide neutral axes about which vibrations may occur with a minimum of elastic displacement. It will be appreciated that the entire panel is supported on a system of such neutral axes rather than at the corners, so as to avoid the excessive distortions characteristic of the conventional mounts.

It will be understood that the structure is susceptible to various modifications in different installations as fall within the scope of the appended claims.

I claim:

1. A device for supporting an instrument against vibration in a framework including bracket means adapted to engage said framework, resilient members mounted on said bracket means, a sub-assembly mounted on said resilient members, additional resilient members positioned on said sub-assembly, a second sub-assembly positioned on said second mentioned resilient members and having means mounted thereon to support said instrument.

2. An instrument panel support for mounting a panel within a framework against vibration, including bracket means adapted to be fastened to said framework, resilient cushion members mounted on said bracket means, a bridge member resting on said resilient members, a plurality of resilient members positioned on said bridge member, a sub-assembly mounted on said last-mentioned resilient members, said sub-assembly having depending members to support said instrument panel at approximately the top center thereof, and a pair of damping sub-assemblies at either side of said instrument panel to limit its movement.

3. An instrument panel support for mounting a panel within a framework against vibration, including bracket means adapted to be fastened to said framework, resilient cushion members mounted on said bracket means, a bridge member resting on said resilient members, a plurality of resilient members positioned on said bridge member, a sub-assembly mounted on said last-mentioned resilient members, said sub-assembly having depending members to support said instrument panel at approximately the top center thereof.

4. A vibration absorbing mounting for an instrument panel or the like including bracket means, an intermediate member connected to said bracket means, resilient means between said intermediate member and said bracket means, a second resilient means mounted on said intermediate member, and a panel supporting member mounted on said second resilient means.

5. A vibration absorbing mount comprising bracket means, resilient members mounted on said bracket means, an intermediate frame mounted on said resilient members, a bore in said resilient members, a pin having a smaller diameter than said bore extending through said bracket and through said intermediate member, a pad on said pin above said intermediate member, a spring catch on said pin, additional resilient members on said intermediate member, a plate mounted on said additional resilient members, and depending means extending through said plate between said last mentioned resilient members for supporting an object.

6. An instrument panel support for mounting a panel within a framework against vibration, including bracket means adapted to be fastened to said framework, resilient cushion members mounted on said bracket means, a bridge member resting on said resilient members, a plurality of resilient members positioned on said bridge member, a sub-assembly mounted on said last-mentioned resilient members, said sub-assembly having depending members to support said instrument panel at approximately the top center thereof, said bridge member being depressed intermediate its ends so that the bottom thereof is in a plane approximating that of the bracket means.

7. A vibration limit check comprising in combination a vibrating plate having an opening, a frame, a bolt attached to said frame, said bolt passing thru the opening in said plate, the opening being larger than the bolt so that the plate and bolt do not touch, a cushioning pad of elastic spongy material around said bolt, said pad being thinner than the clearance between the plate and frame, and a rigid plate attached to said bolt, said plate extending over the area of spongy cushioning pad, whereby low resonance for ordinary impacts is combined with mechanical security under shock.

CECIL S. ROBINSON.